United States Patent

[11] 3,620,490

[72] Inventor Francis Eugene Roberts
R.R.#4, Hwy. 41, N., Madisonville, Ky. 42431
[21] Appl. No. 79,470
[22] Filed Oct. 9, 1970
[45] Patented Nov. 16, 1971

[54] CABLE HANGER
3 Claims, 4 Drawing Figs.

[52] U.S. Cl. .................................................. 248/58,
85/79, 248/220.5, 248/339
[51] Int. Cl. ...................................................... F16l 3/02,
F16b 13/10
[50] Field of Search........................................... 248/58, 71,
220.5; 85/339, 67, 79, 75; 287/54 E, 124

[56] References Cited
UNITED STATES PATENTS
| | | | |
|---|---|---|---|
| 2,349,933 | 5/1944 | Barry............................ | 287/54 E |
| 2,918,840 | 12/1959 | Roesler ........................ | 85/69 |
| 3,339,449 | 9/1967 | Lerich............................ | 85/75 |

FOREIGN PATENTS
| | | | |
|---|---|---|---|
| 347,632 | 7/1960 | Switzerland.................. | 85/79 |

Primary Examiner—Chancellor Harris
Attorney—William R. Price

ABSTRACT: Discloses a cable hanger adapted to fit into a blind hole of a mine roof so as to suspend cable or other power conduit from the roof of a mine. The cable hanger comprises a shaft, bent at one end, to form a hook and threaded at the other end for provision of an expansion shell. The expansion shell consists of an upper relatively immovable member having a smooth axial bore for fitting over the threaded portion of the shaft and a movable lower member containing a smooth axial bore for slidable fit over the threaded portion of said shaft. Each member has an angularly beveled engaging end surface designed to slide diagonally upwardly or downwardly and laterally or medially over the complementary angularly beveled end surface of the other. A threaded nut engageable with the threaded portion of said shaft is welded to an elongated sleeve which has a smooth axial bore fitted over the shaft portion of said hanger and extends outside the blind hole at its lower end to provide a wrench engaging surface for revolving the sleeve and the nut welded thereto. This brings the nut into abutting relationship with the lower movable expansible member of said expansion shell thereby forcing the complementary angularly beveled end surface upwardly and outwardly to expand in said dead hole.

Rotating the sleeve in the opposite direction, thereby revolves the nut allowing the expandable member to move downwardly so that the complementary angularly beveled end surfaces come into axial alignment, allowing the entire mechanism to be removed from the blind hole.

PATENTED NOV 16 1971 3,620,490

INVENTOR
FRANCIS EUGENE ROBERTS

Wm. R. Price
ATTORNEY

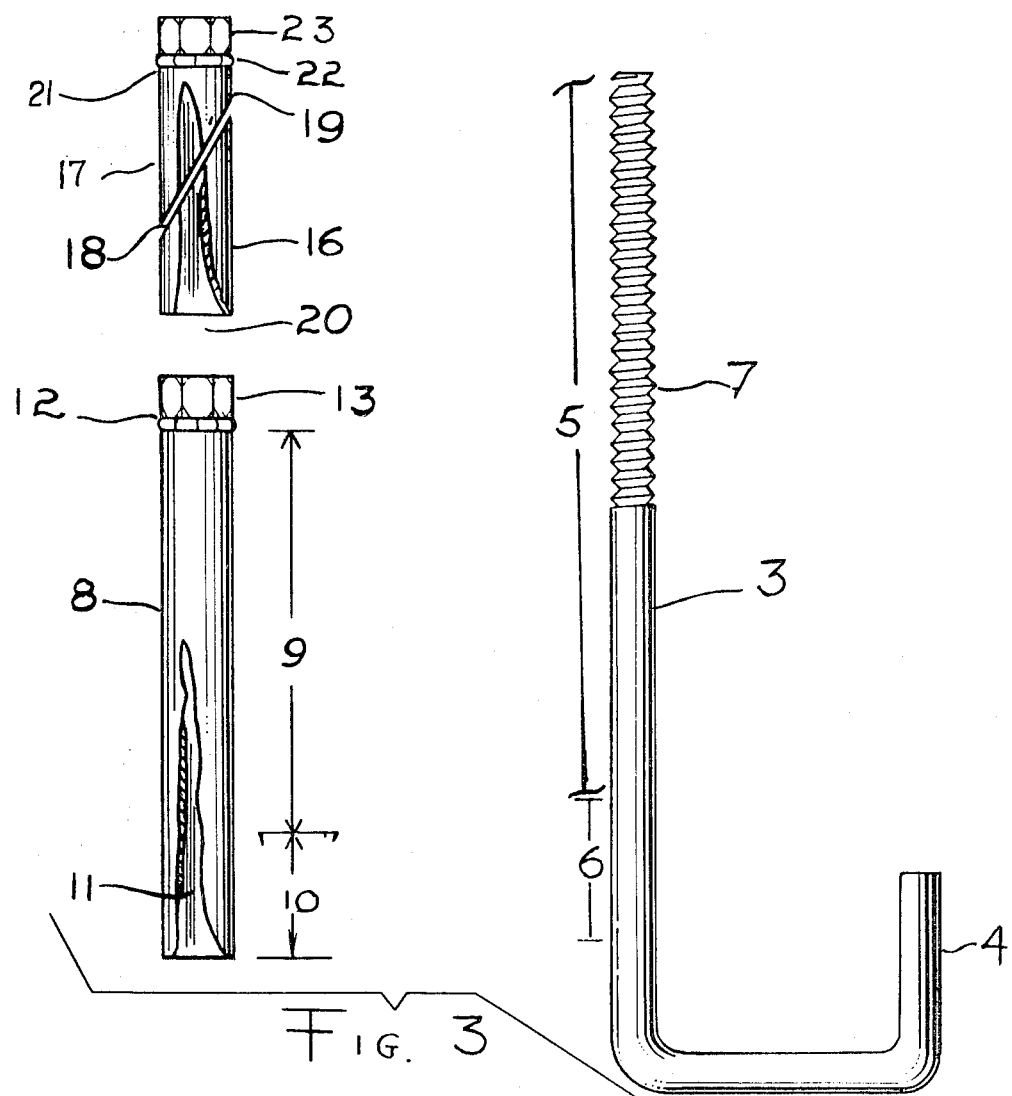
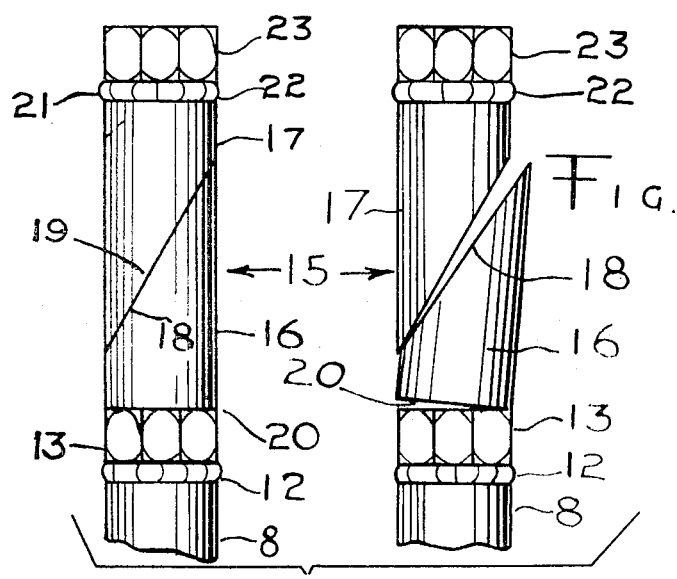

3,620,490

CABLE HANGER

FIELD OF THE INVENTION

This invention relates to a removable cable hanger for use in underground mine tunnels for suspending electric cables and conduits from the ceiling so as to keep them up and away from heavy mining equipment. More specifically, this invention relates to a removable cable hanger having an expansion shell in which the lower member is forced into expansible position by revolution of a sleeve extending outside of a blind hole in the roof of the mine.

DESCRIPTION OF THE PRIOR ART

The recent mine safety act has put added emphasis on the use of cable hangers for use in mine tunnels. Many proposals have been made for cable hangers and other types of rock anchors such, for example, as are described in the U.S. Pat. to Hollander, No. 2,177,138, Dempsey, No. 2,862,368; Roesler, No. 2,918,840; and Lerich No. 3,339,449. Without exception, each of these hangers have required that the bolt or rod forming the shaft of the hanger be rotated, in order to cause the expansion shell to expand. Accordingly, the threads of the bolt, in proximity to the nut, (or other mechanism which causes the shell to expand), became bent, scarred and damaged, thus seriously limiting the usefulness of the shaft of the hanger for another location. Many of the expandable expansion shells were of the expendable type so that the cost of an expansion shell would have to be borne over and over again as the shaft was moved to a new location. In any even, due to the unprotected area of the threaded shaft portion, from jagged rocks and abrasive dust particles (such as are found in mine tunnels) the limited life of removable cable hangers has been a problem.

SUMMARY OF THE INVENTION

According to my invention, the threads of the shaft, in proximity to the nut causing the expansible shell to expand, is protected by a tightening sleeve which extends into the blind hole and extends outside of the blind hole for engagement with a wrench or other device for rotating same in and out of position.

Further, the initial cost of my improved cable hanger, is minimized by the use of smooth bore standard pipe cut diagonally so as to form angularly beveled end facing means as the expansible members of the expansion shell and a smooth bore pipe as the tightening sleeve. A standard threaded nut welded to the tightening sleeve and welded to the upper member of the expansion shell provides threadable engagement means for these members with the threaded portion of the shaft. Thus, the cable hanger is formed by bending a metal rod at one end to form the hook portion of the hanger and by threading the shaft portion at the other end. The tightening sleeve is slipped over the threaded end and screwed down to the base of the threaded portion. The two tubular pieces, (cut diagonally to form complementary beveled engaging end faces of the expansion shell), are slipped over the top of the threaded portion of the shaft. The top member of the expansion shell is screwed down onto the shaft through the means of a standard nut welded thereto. In this manner, the smooth bore piece of elongated pipe forming the tightening sleeve provides a wrench engaging surface and protects the threads of the portion of the shaft so that the nut can push the bottom half of the expansion shell in and out of expansible position many, many times without damage from grit and jagged pieces of rock or coal.

BRIEF DESCRIPTION OF THE DRAWINGS

FIG. 3 is an exploded view, with parts in section, illustrating the various members forming the cable hanger of this invention.

FIG. 4 is a side elevational view illustrating the expansion shell in axially aligned position and in expansible condition.

DESCRIPTION OF THE PREFERRED EMBODIMENT

Figure 1:
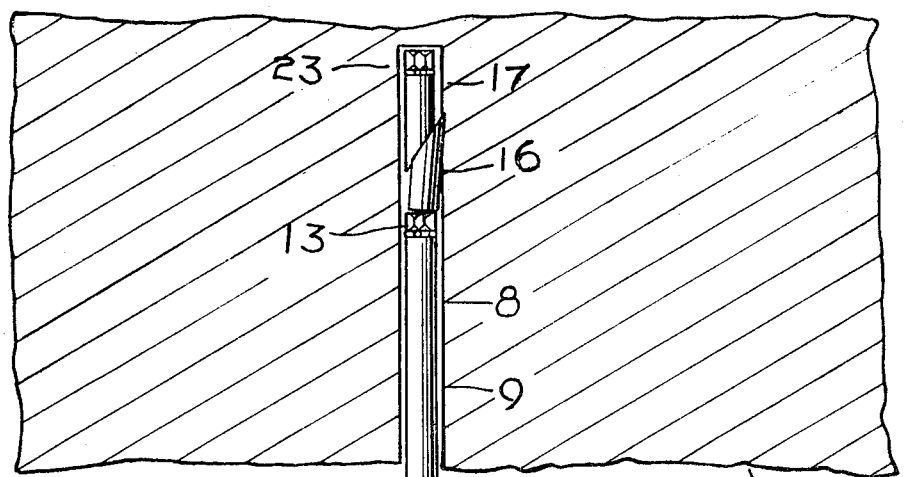
FIG. 1 is a pictorial view illustrating the cable hanger of this invention in position in a blind hole in the roof of a mine tunnel.
Figure 2:
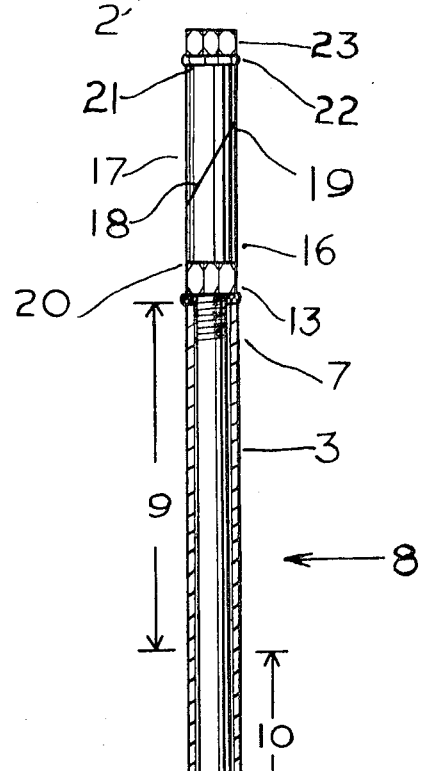
FIG. 2 is a side elevation, with portions in section, illustrating the cable hanger of this invention in assembled condition.

Referring now to the drawings, the cable hanger 1, is shown in position in a blind hole drilled in the rock roof R of a mine tunnel T. The cable 2, is shown in dotted lines in the hook portion 4, of the cable hanger 1.

The cable hanger consists of the shaft 3, fabricated of a rod bent in the form of a hook 4, at one end, and threaded to form a threaded portion 7 at the other end. It consists essentially of two parts; an inner end portion 5, which is relatively long and is adapted to fit normally well within the blind hole drilled in the mine roof R, threaded an outer end portion 6, which fits partially in the blind hole of the mine roof and partially outside thereof. The outer end portion 6 is contiguous with the bent hook portion 4. Fitted over the shaft 3, of the cable hanger 1, is tightening sleeve 8, made up of a piece of pipe with a smooth bore 11. Again, for purposes of description, this piece of pipe has been described as consisting of an inner end portion 9, which normally fits within the blind hole of the mine roof and an outer end portion 10, which extends primarily outside of the hole of the mine roof and provides a wrench engaging surface. A standard threaded nut 13 is welded to the top annular shoulder of the smooth bore sleeve 8 by weld 12. The sleeve 8 and nut 13 is screwed down onto the threaded portion 7, so that the threaded nut 13 is in proximity to the base of the portion 7 of the shaft 3. The expansion shell 15, consists of two portions, a lower movable portion 16, and an upper, relatively immovable portion 17. These pieces are made from a piece of smooth bore pipe sawed diagonally to form, respectively a complementary angularly beveled end surface 18, on the lower expansion member 16, and a complementary angularly beveled end surface 19, on the upper relatively immovable expansion member 17. The lower expansion member 16, has a flat annular shoulder 20, which comes into abutting relation with nut 13, welded to the sleeve 8. The upper expansion member 17 has a flat annular shoulder 21, which is welded by weldment 22, to upper threaded nut 23.

As will be apparent, the lower expansion shell member 16, is merely slipped over the threaded portion of the shaft 7 so that the flat annular shoulder 20 comes into engagement with the upper shoulder of threaded nut 13. The upper expansion member 17 is placed over the threaded portion and is screwed down onto the threaded portion of the shaft 3, by rotation of threaded nut 23. In order to maintain the angularly beveled surfaces 18 and 19, in complementary axially aligned position it quite often is desirable to manually lift the lower expansion member 16 so as to align it with the angularly beveled surface 19 of upper expansion member 17 and hold the two in engagement while the nut 23 is screwed onto the threaded portion of shaft 7.

As the cable hanger 1 is placed into the blind hold of the roof R of mine tunnel T, the wrench engaging portion 10 of the sleeve may be rotated by a wrench held by the operator. Lower nut 13, is therefore rotated into engagement with the lower shoulder 20 of the relatively movable expansion member 16. Rotation of the lower nut 13, causes it to travel upwardly and causes the lower expansion member 16 to move upwardly and because of the angularly beveled surface 18 causes the lower member 16 to move laterally to engage the sidewalls of the blind hole. It will be noted that during this time the threads 7 of the shaft 3 are completely protected from jagged rock and abrasive particles so that the shell can be placed back into axially aligned arrangement merely by rotating the sleeve 8, in the opposite direction. This allows the movable expansion shell member 16, to move downwardly to axially align the complementary beveled angular faces 18 and 19. The member, then can be removed from the blind hole and taken to another location.

The fabrication of this cable hanger effects many economies, since it is only necessary to utilize a standard pipe as the sleeve 8 and a standard pip as the expansion shell 15. Thus the cable hanger of this invention is rugged and is of cheap and economical fabrication.

Many improvements will occur to those skilled in the art from the detailed description hereinabove given, and such is intended to be nonlimiting in scope except as would be commensurate in scope with the appended claims.

I claim:

1. A reusable mine roof cable hanger, which comprises:
   A. an elongated shaft member having:
      1. an elongated inner end portion for insertion in a blind hole of a mine roof and having the upper and thereof threaded and;
      2. an outer end portion mounted for positioning partially within said blind hole and extending partially outside said blind hole;
   B. a hook portion, contiguous with the outer end portion of said shaft;
   C. an expansion shell located at the upper end of said inner end portion of said shaft comprising;
      1. an upper nut
      2. a relatively fixed upper expansion member having a smooth, axially extending bore, larger than said shaft for fitting over said inner end portion of said shaft and having an upper flat annular shoulder welded to said upper nut and having an angularly beveled engaging lower end surface;
      3. a slidable movable lower expansion member, having an axially extending bore, larger than said shaft, for fitting over said inner end portion of said shaft and having a lower flat annular shoulder and upper complementary angularly beveled engaging end surface for slidable movement on the lower angularly beveled engaging end surface of said relatively fixed upper expansion member and for lateral and medial movement of said lower expansion member in and out of engagement with the wall of said blind hole;
   D. a lower threaded nut threadably engaged in the threads on the inner end portion of said threaded shaft and in abutting relationship with the flat annular shoulder of said lower slidably movable lower expansion member;
   E. a sleeve having a smooth axial bore larger than said shaft and having upper and lower flat annular shoulders,
      1. said upper flat annular shoulder being welded to the lower surface of said lower threaded nut
      2. said lower flat annular shoulder extending outside of said blind hole and the lower portion of said sleeve providing wrench engaging means for rotating said sleeve and said lower nut to cause said lower nut to travel upwardly and downwardly on said shaft so as to effect slidable movement between the beveled surfaces of said members of said expansion shell and a lateral and medial movement of said lower expansion member relative to said upper expansion member.

2. A method of making a removable mine roof cable hanger, which comprises:
   A. bending one end of an elongated rod of steel into the form of a hook at the end of an elongated shaft;
   B. threading the upper end portion of said elongated shaft;
   C. welding a nut having complementary threads to said shaft to an elongated pipe having a smooth bore larger than said shaft;
   D. mounting said pipe over said unthreaded portion of said shaft and engaging the threads of said nut with the threads of said shaft and rotating said nut down into proximity with the base of said threaded portion of said shaft;
   E. cutting a piece of pipe with a smooth axial bore larger than said shaft diagonally relative to the long axis of said pipe to form a first and second expansion member each with an angularly beveled complementary engaging face and a flat annular shoulder;
   F. placing said first expansion member over said threaded portion of said shaft with the flat annular shoulder in abutting relation with the nut near the base of said threaded portion of said shaft;
   G. welding the flat annular shoulder of said second expansion member to the lower edge of a second threaded nut having threads engageable with the threads of the threaded portion of said shaft;
   H. placing said second expansion member over said shaft with the angled, beveled face in complementary abutting relation with said angled beveled face of said first expansion member and engaging the threads of said second nut with the threads of said shaft and turning said nut to mount same onto said shaft.

3. The method of making a removable mine roof cable hanger, as defined in claim 2, the further step of:
   A. raising said flat annular shoulder of said first expansion member out of abutting relation with said first nut and placing said beveled complementary faces of said first and second expansion members in complementary and axial alignment;
   B. maintaining said first and second members in complementary and axial alignment while said second nut is being rotated into full engagement with the threaded end portion of said shaft.

* * * * *